(12) United States Patent
Yen et al.

(10) Patent No.: US 8,435,654 B2
(45) Date of Patent: May 7, 2013

(54) BIT PATTERNED DEVICE

(75) Inventors: Bing Yen, Cupertino, CA (US); Jim Hennessey, Campbell, CA (US); Eric Freeman, Oakland, CA (US); Kim Yang Lee, Fremont, CA (US); David S. Kuo, Palo Alto, CA (US); Mark Ostrowski, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/208,095

(22) Filed: Sep. 10, 2008

(65) Prior Publication Data

US 2010/0062282 A1    Mar. 11, 2010

(51) Int. Cl.
    *G11B 5/66*    (2006.01)
(52) U.S. Cl.
    USPC .......................................... 428/836; 360/135

(58) Field of Classification Search .................... None
See application file for complete search history.

(56) References Cited

U.S. PATENT DOCUMENTS

| | | | |
|---|---|---|---|
| 2005/0199581 A1* | 9/2005 | Suwa et al. | 216/22 |
| 2006/0063042 A1* | 3/2006 | Takai et al. | 428/848.2 |
| 2007/0281078 A1* | 12/2007 | Kikitsu et al. | 427/127 |

OTHER PUBLICATIONS http://www.merriam-webster.com/dictionary/proximal, Jan. 2012.*

* cited by examiner

*Primary Examiner* — Holly Rickman
(74) *Attorney, Agent, or Firm* — Ladas & Parry, LLP

(57) ABSTRACT

The invention relates to bit patterned recording media having a stop layer for chemical mechanical polishing. One embodiment of the present invention is a method of manufacturing a magnetic recording medium comprising the step of planarizing by chemical mechanical polishing until the stop layer is reached. The present invention also provides a magnetic recording medium having a stop layer.

13 Claims, 4 Drawing Sheets

BIT PATTERNED DEVICE

BACKGROUND

Magnetic recording media are widely used in various applications, e.g., in hard disk form, particularly in the computer industry, for storage and retrieval of large amounts of data/information. These recording media are conventionally fabricated in thin film form and are generally classified as "longitudinal" or "perpendicular", depending upon the orientation (i.e., parallel or perpendicular) of the magnetic domains of the grains of the magnetic material constituting the active magnetic recording layer, relative to the surface of the layer.

In the operation of magnetic media, the magnetic layer is locally magnetized by a write transducer or write head to record and store data/information. The write transducer creates a highly concentrated magnetic field which alternates direction based on the bits of information being stored. When the local magnetic field applied by the write transducer is greater than the coercivity of the recording medium layer, then the grains of the polycrystalline magnetic layer at that location are magnetized. The grains retain their magnetization after the magnetic field applied by the write transducer is removed. The direction of the magnetization matches the direction of the applied magnetic field. The pattern of magnetization of the recording medium can subsequently produce an electrical response in a read transducer, allowing the stored medium to be read.

In conventional hard disk drives, data is stored in terms of bits along the data tracks. In operation, the disk is rotated at a relatively high speed, and the magnetic head assembly is mounted on the end of a support or actuator arm, which radially positions the head on the disk surface. By moving the actuator arm, the magnetic head assembly is moved radially on the disk surface between tracks.

Lithographically patterned media, also known as bit-patterned media, are being pursued to increase areal recording density as compared to conventional recording media. Bit-patterning combines several hundred media grains into one single magnetic island, which does not require large coercivities. The manufacturing of lithographically patterned media typically involves using photolithography techniques to form a pattern of discrete and separated magnetic regions. This may include a nanoimprint process, i.e., the stamping of soft resist materials with hard stampers to mold a pattern within the resist.

As the size and spacing of magnetic device features have decreased to increase recording density, the height of the steps of these features have increased. Also, as the number of layers deposited during the manufacture of magnetic devices increases, irregularities in the surface of the layers increases. As a result, chemical mechanical polishing (CMP) may be used to planarize feature surfaces during processing.

CMP is used to remove surface topography in order to achieve planar surfaces suitable for photolithographic patterning of complex patterns. Material is removed during a CMP process by a combination of chemical etching and mechanical abrasion. CMP processes typically have a material removal rate of 300 to 500 nanometers (nm) per minute under normal process conditions. Removal continues until an endpoint is reached, which is theoretically the point where all of the excess material is removed, and a smooth planar surface remains.

The CMP endpoint may be determined by a variety of techniques. For example, prior CMP processes have incorporated instruments to measure changes in the surface optical reflectivity, changes in the surface temperature, and changes in eddy currents induced through the layers. Other CMP processes alternatively use prior test runs to estimate polish time to the endpoint. However, these prior CMP endpoint detection techniques are subject to variations as to when the endpoints are detected. Thus, there is a need in the industry for a process capable of accurately detecting CMP endpoints for fabricating consistent and accurate features in bit-patterned media.

SUMMARY

The present invention relates to bit patterned recording media having a stop layer for chemical mechanical polishing.

One embodiment of the invention is magnetic recording medium having a substrate; a magnetic layer supported by the substrate, where the magnetic layer has an array of discrete magnetic bits separated by a non-magnetic filler material; and a stop layer for chemical mechanical polishing. In another variation, the magnetic recording medium further includes one or more cap layers and/or lubricant layers.

According to another variation, the stop layer is disposed between the discrete magnetic bits. In another variation, the stop layer has a thickness of about 2 to about 200 nm, preferably about 2 to about 10 nm.

According to yet another variation, the filler material is selected from $Al_2O_3$, $SiO_2$, $SiO_xN_y$, and combinations thereof, preferably $Al_2O_3$. In another variation, the stop layer is selected from carbon, platinum, gold, chromium, ruthenium, diamond, tungsten, SiC, $SiO_xN_y$, NiCu, and combinations thereof, preferably carbon. In one preferred embodiment, the filler material is $Al_2O_3$ and the stop layer is carbon.

Another embodiment of the present invention is a method of manufacturing a magnetic recording medium including the steps of (a) forming a magnetic layer upon a substrate, the magnetic layer having an array of discrete magnetic bits separated by a non-magnetic filler material; (b) depositing a stop layer upon the magnetic layer; (c) depositing an excess layer upon the stop layer; and (d) planarizing by chemical mechanical polishing until the stop layer is reached.

According to one variation, the excess layer comprises $Al_2O_3$.

According to another variation, the step of planarizing by chemical mechanical polishing includes measuring an increase in induced polishing friction to determine the stop layer has been reached.

In another variation, the step of planarizing by chemical mechanical polishing comprises measuring changes in surface optical reflectivities to determine the stop layer has been reached.

In yet another variation, the step of planarizing by chemical mechanical polishing comprises measuring changes in electrical currents to determine the stop layer has been reached.

Additional advantages of this invention will become readily apparent to those skilled in this art from the following detailed description, wherein only the preferred embodiments of the invention are shown and described, by way of illustration of the best mode contemplated for carrying out the invention. As will be realized, this invention is capable of other and different embodiments, and its details are capable of modifications in various obvious respects, all without departing from the invention. Accordingly, the drawings and description are to be regarded as illustrative in nature and not as restrictive.

DETAILED DESCRIPTION

As used herein "substrate" refers to one or more layers that provide a surface suitable for the formation of a bit-patterned magnetic layer thereupon in the manufacture of a magnetic recording medium. The substrate may comprise one or more different materials.

Figure 1:
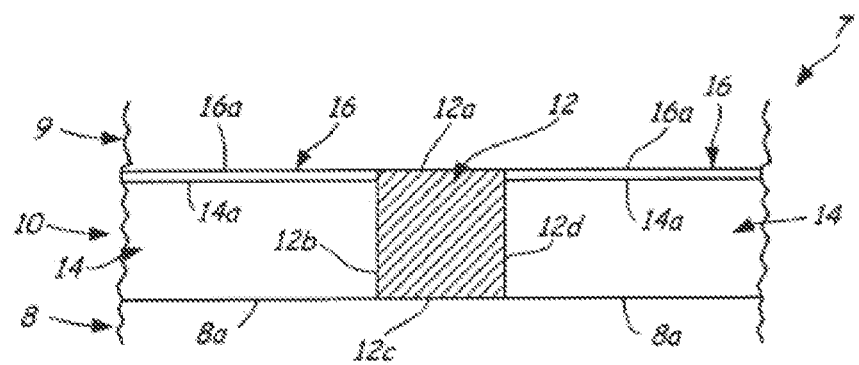
FIG. 1 is a sectional view of a magnetic recording medium according to one embodiment of the present invention.

FIG. 1 is a sectional view depicting a portion 7 of a magnetic recording medium according to one embodiment of the present invention, which includes substrate 8, optional overlying layer(s) 9, and magnetic layer 10. Underlying substrate 8 is the portion of the magnetic recording medium that is formed prior to magnetic layer 10, and includes top surface 8a, upon which magnetic layer 10 is formed. Optional overlying layer(s) 9 is the portion of the magnetic recording medium that is disposed on top of magnetic layer 10, after magnetic layer 10 is formed and planarized. Underlying substrate 8 and overlying layer(s) 9 may provide a variety of characteristics for the magnetic recording medium, such as additional magnetic properties, magnetic isolation, or protection.

Magnetic layer 10 includes an array of discrete magnetic bits 12 (represented singularly in FIG. 1), non-magnetic filler material 14, and stop layer 16, where stop layer 16 is used to detect a chemical mechanical polishing (CMP) endpoint. Through the use of stop layer 16, target thickness of magnetic layer 10 is accurately controlled, and within wafer non-uniformity (WIWNU) is improved.

Magnetic bit 12 is the portion of magnetic layer 10 that provides magnetic properties, and exists in a region dimensionally defined by surfaces 12a-12d. Surfaces 12b, 12d are disposed adjacent to filler material 14. While surfaces 12a-12d depict magnetic portion 12 as rectangular, magnetic bit 12 may alternatively be other shapes, such as trapezoidal. Magnetic bit 12 is derived of one or more high-magnetic-moment materials, such as a magnetic alloy. Examples of suitable magnetic alloys include iron, cobalt, nickel, and combinations thereof. Examples of suitable combinations include nickel-iron, cobalt-iron, and nickel-cobalt-iron materials.

Filler material 14 is a non-magnetic layer and includes top surface 14a. Filler material 14 isolates magnetic portion 12 in the lateral directions of surfaces 12b, 12d. Filler material 14 is derived from non-magnetic materials, such as oxide materials. Examples of suitable oxide materials include aluminum oxide ($Al_2O_3$), silica dioxide ($SiO_2$), $SiO_xN_y$, and combinations thereof. An example of a particularly suitable material includes aluminum oxide.

Filler material 14 may have a thickness as individual needs may require, for example, where the thickness of filler material 14 is the distance between top surface 14a and top surface 8a of underlying substrate 8. Preferably, filler material 14 has a thickness less than the thickness of magnetic bit 12 to account for the thickness of stop layer 16 (i.e., the thickness of magnetic bit 12 equals the combined thicknesses of filler material 14 and stop layer 16).

Stop layer 16 is disposed on top surface 14a of filler material 14 adjacent to surfaces 12b, 12d of magnetic portion 12. Stop layer 16 includes top surface 16a and provides a means for detecting the CMP endpoint for planarizing magnetic layer 10. This provides an accurate control of the target thickness of magnetic feature 10. Preferably stop layer 16 has a thickness between about 2-100 nm, and more preferably between about 2-10 nm, where the thickness is the distance between top layers 16a of stop layer 16 and top layer 14a of filler material 14.

Stop layer 16 is non-magnetic, corrosion resistant, and has high removal rate selectivity versus the magnetic alloys of magnetic bit 12 and magnetic isolation materials of filler material 14 (i.e., relatively high abrasion resistance). By being non-magnetic, stop layer 16 assists filler material 14 in magnetically isolating magnetic portion 12 in the lateral directions of surfaces 12b, 12d. Corrosion resistance is also desired so that stop layer 16 withstands chemical attacks by CMP slurries.

Preferably, the selectivities of the materials for stop layer 16 versus the magnetic alloys of magnetic bit 12 and magnetic isolation materials of filler material 14 are at least about eighty-to-one. Examples of suitable materials for stop layer 16 include platinum, gold, chromium, ruthenium, diamond, tungsten, SiC, $SiO_xN_y$, NiCu, and combinations thereof. An example of a particularly suitable material for stop layer 16 is carbon. Carbon is non-magnetic, corrosion resistant, and provides a high selectivity versus materials for magnetic bit 12 and filler material 14.

Stop layer 16 provides a means for accurately detecting the endpoint of a CMP process, which may be accomplished in several manners. First, the CMP endpoint may be detected based upon measurable fluctuations in the motor current of a CMP apparatus (not shown). These fluctuations are induced by changes in polishing friction during a polishing process (i.e., changes in removal rates), and correlate to the differences in removal rate selectivities between the layers. Additionally, the CMP endpoint may also be detected by changes in surface optical reflectivity and changes in eddy currents induced through the layers. The detection of the CMP endpoint through these techniques allows top surface 16a and surface 12a to be evenly planarized for providing a smooth surface for magnetic layer 10.

Figure 2A:
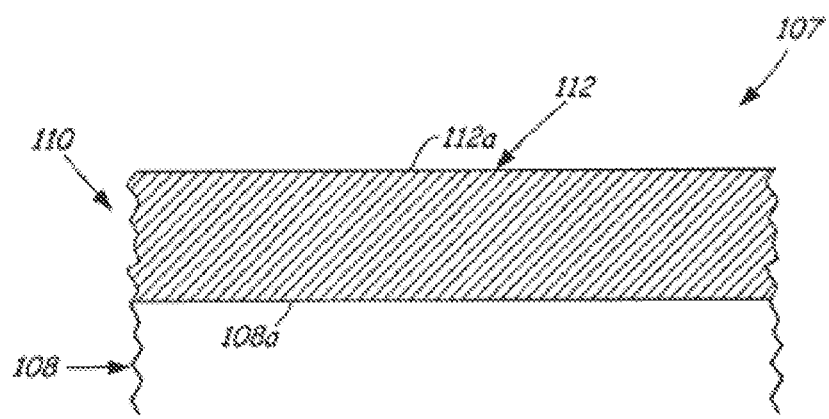
FIGS. 2A-2G are sectional views illustrating the steps of a method of manufacturing a magnetic recording medium according to one embodiment of the present invention.

FIGS. 2A-2G are sectional views illustrating one embodiment of a method of forming a magnetic recording medium according to the present invention. FIG. 2A depicts portion 107 of a magnetic recording medium, which is analogous to portion 7, prior to the formation of magnetic layer 10. As illustrated, portion 107 includes underlying substrate 108 and magnetic layer 110 at an initial stage of formation prior to the formation of discrete magnetic bits and the additional of filler material by conventional photolithography processes. Alternatively, bit-patterning processes as described above may be used.

Figure 2B:
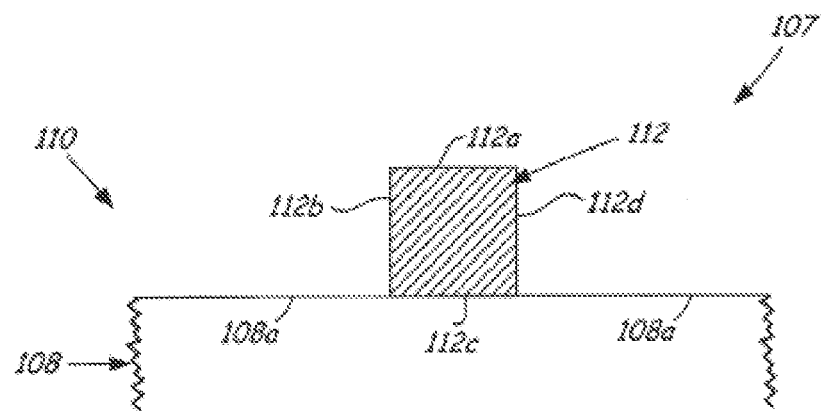

Whether by conventional photolithographic processes or bit-patterning, discrete magnetic bits 112 are formed on substrate 108, as depicted in FIG. 2B. As shown, magnetic bit 112 has dimensions defined by surfaces 112a-112d. Magnetic bit 112 has a width defined by the distance between surfaces 112b, 112d.

Figure 2C:
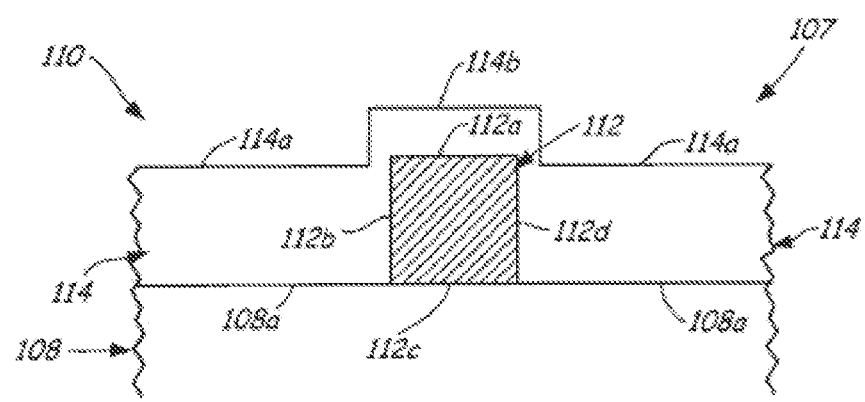

As depicted in FIG. 2C, after magnetic bit 112 is formed, non-magnetic material is deposited on top surface 108a of underlying substrate 108 and magnetic bit 112 to form filler material 114. After deposition, filler material 114 has a thickness defined by the distance between top surface 114a of filler material 114 and top surface 108a of underlying substrate 108. Filler material 114 also includes a step portion, noted by step surface 113b, formed over magnetic bit 112.

Figure 2D:
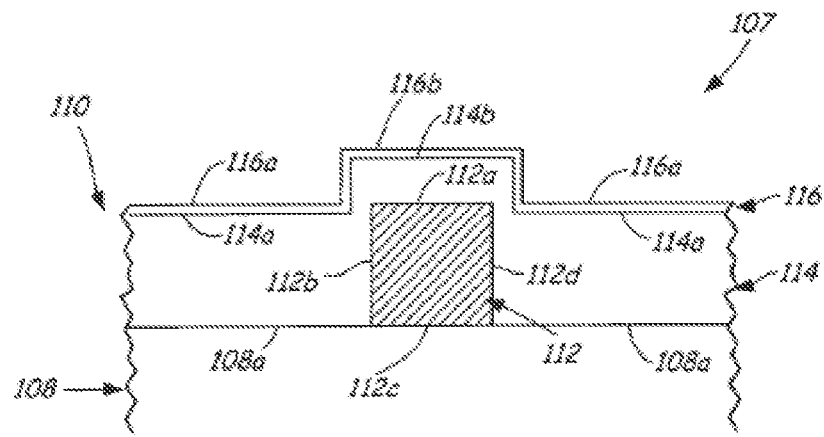

After filler material 114 is deposited, stop layer 116 is formed by depositing material on top of filler material 114. This is depicted in FIG. 2D. After deposition, stop layer 116 has a thickness defined by the distance between top surface 116a of stop layer 116 and top surface 114a of filler material 114. Stop layer 116 also includes a step portion, noted by step surface 116b, formed over magnetic bit 112.

As previously mentioned, it is preferable that the combined thicknesses of filler material 114 and stop layer 116 are generally equal to the thickness of magnetic bit 112. Alternatively, the combined thicknesses of filler material 114 and stop layer 116 may be less than the thickness of magnetic bit 112. In this case, the additional amount of magnetic bit 112 will be removed by the CMP process. Moreover, it is noted that the combined thicknesses of filler material 114 and stop layer 116 should not be greater than the thickness of magnetic bit 112. This would prevent the CMP process from planarizing magnetic layer 110 when stop layer 116 is reached.

Figure 2E:
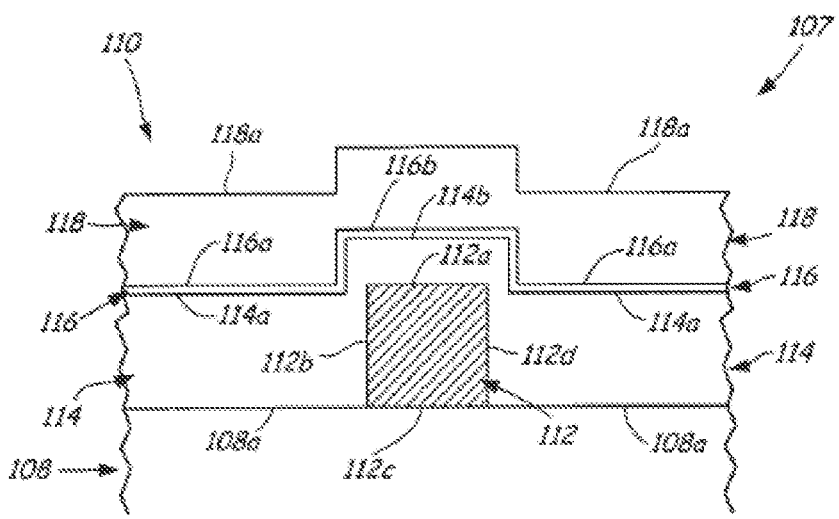

After stop layer 116 is formed, an additional layer of nonmagnetic material is deposited on top of stop layer 116, as depicted in FIG. 2E to form excess layer 118. The thickness of excess layer 118 is the distance between top surface 118a of excess layer 118a and top surface 116a of stop layer 116. Excess layer 118 is incorporated to provide an adequate polishing time to remove the step portions above magnetic bit 112, noted by step surfaces 114b, 116b.

Suitable materials for excess layer 118 include the suitable materials described in FIG. 1 for filler material 14. Moreover, it is desirable that the materials used for stop layer 116 have higher removal rate selectivities versus the materials used for excess layer 118. This allows the CMP process to remove excess layer 118 at a greater rate than stop layer 116. Generally, preferred thicknesses of excess layer 118 provide an adequate polish time to remove the step portions above magnetic bit 112.

After magnetic layer 110 as depicted in FIG. 2E is formed, magnetic layer 110 is polished via a CMP process to planarize magnetic layer 110 and expose magnetic bit 112. During the CMP process, material is removed from excess layer 118 by a combination of chemical etching and abrasion by the polishing pad of the CMP apparatus (not shown). While the polishing pad removes the material from excess layer 118, polishing friction is induced on the polishing pad. This polishing friction corresponds to the material removal rate and is measurable by the motor current of the CMP apparatus.

Additionally, the CMP endpoint may further be detected by changes in the surface optical reflectivities when excess layer 118 is removed and top surface 116a of stop layer 116 is exposed. The surface optical reflectivity is measured for an entire wafer, by laser or by normal light enhanced by optical fibers. The light is directed to the surface being polished (i.e., excess layer 118), reflects the light at a given angle based upon the material used for excess layer 118. As excess layer 118 is removed by the CMP apparatus, the reflectivity remains substantially unchanged. However, when stop layer 116 is reached, the reflectivity changes because of the differences in reflectivities between the materials of stop layer 116 and excess layer 118. The CMP endpoint may additionally be triggered when this change in surface optical reflectivity is detected. Those skilled in the art will appreciate and understand suitable systems for measuring the surface optical reflectivity.

The CMP endpoint may also be detected by measuring changes in electrical currents (i.e., eddy currents) induced through the layers. The electrical currents are induced from the CMP slurry through the layers of magnetic feature 110, and are detected by a sensor (not shown) located below the wafer. As material is being removed by polishing, the electrical currents correspondingly change due to the drop in electrical resistance. As such, the rate of change in the electrical currents detected correlate to the rate of material removal. Therefore, when the rate of material removal is substantially reduced (e.g., when stop layer 116 is reached), the rate of change in the electrical current is also substantially reduced. The CMP endpoint may additionally be triggered when the rate of change in the electrical current are substantially reduced. Those skilled in the art will appreciate and understand suitable systems for inducing and measuring eddy currents.

Moreover, detecting the CMP endpoint by combinations of these techniques further decreases the variations in detecting the CMP endpoint. This provides greater accuracy in controlling the thickness of magnetic layer 110.

Figure 2F:
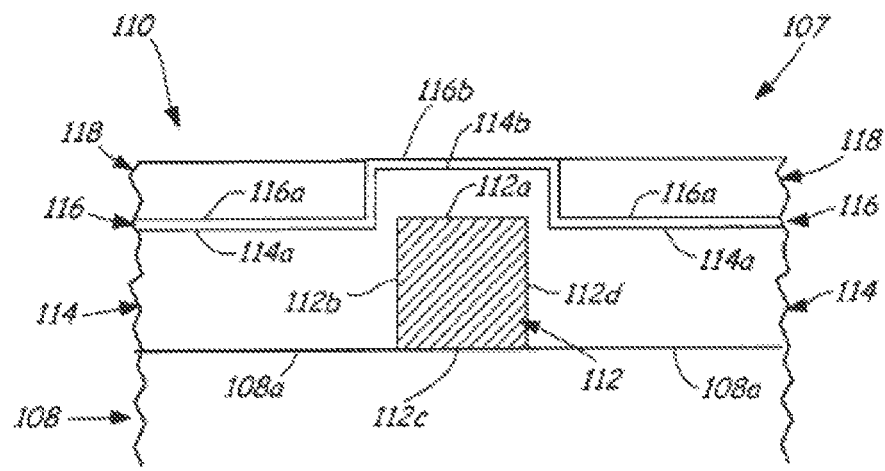

FIG. 2F depicts magnetic layer 110 after a portion of excess layer 118 has been removed such that step surface 116b of stop layer 116 is exposed. At this point, because of the higher removal rate selectivity of stop layer 116 versus excess layer 118, friction induced on the polishing pad increases (i.e., removal rate decreases). Nonetheless, the increased friction due to the encounter of step surface 116b of step layer 116 does not trigger the CMP endpoint detection. The step portion over magnetic bit 112 is relatively small compared to the overall size of magnetic layer 110. As such, the increase in the friction induced on the polishing pad at this point is not great enough to trigger the CMP endpoint detection.

Moreover, the surface optical reflectivity remains substantially unchanged because excess layer 118 still remains in the regions over top surface 116a of stop layer 116. The rates of change in the electrical current are also not substantially reduced by the reduction in the material removal rate imposed by top surface 116b of stop layer 116. Removal of material by the CMP process continues until top surface 116a of stop layer 116 is reached. At this point, due to the high removal rate selectivity of stop layer 116 versus excess layer 118, the increase in friction induced on the polishing pad is high enough to trigger the CMP endpoint detection.

Additionally, the surface optical reflectivity changes because excess layer 118 is removed to expose stop layer 116. Moreover, because the material removal rate is substantially reduced at stop layer 116, the rate of change in the induced electrical current is correspondingly reduced. These additional techniques also provide signals for triggering the CMP endpoint detection.

Figure 2G:
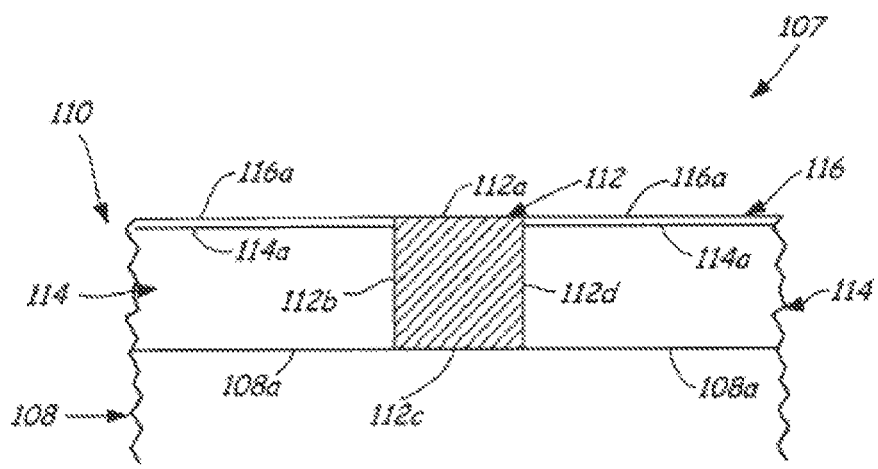

Through the use of stop layer 116, the CMP endpoint is accurately detected, which minimizes thickness variations induced by under-polishing and over-polishing. FIG. 2G depicts portion 107 with magnetic layer 110 after the CMP endpoint has been detected and polishing has been stopped. The result is a smooth planar surface defined by surface 112a of magnetic bit 112 and top surface 116a of stop layer 116. The thickness of magnetic layer 110 is also accurately determined and may be consistently replicated through this method. Subsequently, optional overlying layer(s) 9 may be formed to provide desired electrical and mechanical properties. In some embodiments, the stop layer 116 is external or outside the interface or common/shared boundary of the magnetic bits 112 and the nonmagnetic filler 114.

By detecting the CMP endpoint through a stop layer, the target thickness of bit patterned features is accurately controlled and WIWNU is improved. This allows magnetic recording media to be fabricated accurately and consistently.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A magnetic recording device comprising:
   a substrate;
   a magnetic layer supported by the substrate, wherein the magnetic layer comprises an array of discrete magnetic bits separated by a non-magnetic filler material, and wherein the magnetic bits have an exposed top surface with respect to the non-magnetic filler material; and
   a stop layer overlying the non-magnetic filler material, wherein the stop layer is between the discrete magnetic bits, and the magnetic bits are configured so that the stop layer is operative to be detected as an endpoint for removal of the magnetic bits,
   wherein at least a portion of said filler material directly contacts at least a portion of said discrete magnetic bits, wherein a combined thickness of the non-magnetic filler material and the stop layer is substantially equal to a height of the magnetic bits.

2. The magnetic recording device of claim 1, wherein the stop layer has a thickness of about 2 to about 200 nm.

3. The magnetic recording device of claim 2, wherein the stop layer has a thickness of about 2 to about 10 nm.

4. The magnetic recording device of claim 1, wherein the filler material is selected from Al2O3, SiO2, SiOxNy, and combinations thereof.

5. The magnetic recording device of claim 1, wherein the filled material comprises Al2O3.

6. The magnetic recording device of claim 1, wherein the stop layer is selected from carbon, platinum, gold, chromium, ruthenium, diamond, tungsten, SiC, SiOxNy, NiCu, and combinations thereof.

7. The magnetic recording device of claim 1, wherein the stop layer comprises carbon.

8. The magnetic recording device of claim 1, wherein the filler material comprises Al2O3 and the stop layer comprises carbon.

9. The magnetic recording device of claim 1, further comprising one or more cap layers and/or lubricant layers, wherein the cap layers and/or lubricant layers are in direct contact with the stop layer and the top surface of the magnetic bits in the array.

10. A device, comprising:
    a substrate;
    an array of discrete magnetic bits on the substrate, wherein the magnetic bits have side surfaces defining a plurality of regions therebetween;
    a non-magnetic filler material formed in the regions, wherein a top surface of the non-magnetic filler material is lower than a top surface of the magnetic bits; and
    a stop layer overlying the non-magnetic filler layer between the magnetic bits, wherein the magnetic bits are configured so that the stop layer is operative to be detected as an endpoint for removal of the magnetic bits and wherein at least a portion of said filler material is adjacent to said discrete magnetic bits and directly contacts at least a portion of said discrete magnetic bits, wherein a combined thickness of the non-magnetic filler material and the stop layer is substantially equal to a height of the magnetic bits.

11. The device of claim 10, wherein the CMP removal rate selectivity of the stop layer is at least about 80 times the CMP removal rate selectivity of either of the magnetic bits or the non-magnetic filler material.

12. The device of claim 11, wherein the overlying layer comprises one or more cap layers and lubricant layers.

13. A device, comprising:
    a substrate;
    an array of discrete magnetic bits on the substrate, wherein the magnetic bits have side surfaces defining a plurality of regions therebetween;
    a non-magnetic filler material formed in the regions, wherein a top surface of the non-magnetic filler material is lower than a top surface of the magnetic bits; and
    a stop layer overlying the non-magnetic filler layer between the magnetic bits, wherein the magnetic bits are configured so that the stop layer is operative to be detected as an endpoint for removal of the magnetic bits and wherein said stop layer is external to an interface between said magnetic bits and said non-magnetic filler material, wherein a combined thickness of the non-magnetic filler material and the stop layer is substantially equal to a height of the magnetic bits.

* * * * *